UNITED STATES PATENT OFFICE.

JOB JOHNSON, OF GLENDALE, NEW YORK.

COMPOSITION FOR ROADWAYS, TILES, &c.

SPECIFICATION forming part of Letters Patent No. 602,082, dated April 12, 1898.

Application filed November 6, 1897. Serial No. 657,682. (No specimens.)

*To all whom it may concern:*

Be it known that I, JOB JOHNSON, a citizen of the United States, residing at Glendale, in the county of Queens and State of New York, have invented a new and useful Composition for Roadways, Tiles, and the Like, of which the following is a specification.

This invention relates to plastic composition for roadways, curbing, tiles, slabs, or blocks for use in the construction of subways or like structures.

The composition is peculiarly adapted as a top surface or layer for roadways and pavements, because it resists the action of the elements and is not perceptibly affected by water, dampness, or traffic.

The composition consists of clay, fifty parts; sharp sand, thirty parts; hard-coal dust, ten parts; pulverized rock-salt, five parts; charcoal-dust, five parts, and water in sufficient quantity to reduce the ingredients to a plastic condition. The mass after being thoroughly mixed may be spread or applied in any of the usual ways commonly resorted to in utilizing cement and like compositions, or the mass may be molded into slabs, tiles, blocks, or other required form and permitted to set and dry, after which they are burned or baked in a kiln or furnace.

The form of the block or tile will depend upon its use, and the burning or baking fuses the ingredients, whereby the degree of hardness peculiar to the composition is obtained.

Having thus described the invention, what is claimed as new is—

A composition for roadways, tiles and the like consisting of clay, sharp sand, hard-coal dust, pulverized rock-salt, charcoal-dust and water, in about the proportions specified.

In testimony that I claim the foregoing as my own I have hereto affixed my signature in the presence of two witnesses.

JOB JOHNSON.

Witnesses:
   CHARLES DOWNING,
   JOHN L. SPADER.